US012086264B1

(12) United States Patent
Vaidyam Anandan et al.

(10) Patent No.: US 12,086,264 B1
(45) Date of Patent: Sep. 10, 2024

(54) SOFTWARE RISK ASSESSMENT

(71) Applicant: Amazon Technologies, Inc., Seattle, WA (US)

(72) Inventors: Sai Vignesh Vaidyam Anandan, Coquitlam (CA); Phillip Simpson, Austin, TX (US); Madhu Preetha Chandrasekaran, New Westminster (CA); Jeremy Jose Elie Hanoun, North Vancouver (CA); Karthik Balakrishnan, Etobicoke (CA)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 17/535,913

(22) Filed: Nov. 26, 2021

(51) Int. Cl.
*G06F 21/57* (2013.01)
*G06F 21/62* (2013.01)
*G06Q 30/018* (2023.01)

(52) U.S. Cl.
CPC ........ *G06F 21/577* (2013.01); *G06F 21/6245* (2013.01); *G06Q 30/018* (2013.01); *G06F 2221/033* (2013.01); *G06F 2221/2101* (2013.01)

(58) Field of Classification Search
None
See application file for complete search history.

(56) References Cited

U.S. PATENT DOCUMENTS

2015/0356477 A1* 12/2015 Milkman ........... G06Q 10/0633
705/7.27
2020/0287910 A1* 9/2020 Zerrad .................. H04L 63/102

* cited by examiner

*Primary Examiner* — Brandon Hoffman
(74) *Attorney, Agent, or Firm* — Davis Wright Tremaine LLP

(57) ABSTRACT

Systems and methods are described for providing a risk assessment for a software application based on evidence obtained from one or more sources. In some aspects, security and compliance evidence may be obtained from one or more evidence sources, for an application offered through a service provider, where the evidence sources include operational data from the application executing within a runtime environment provided by the service provider. The obtained evidence may be mapped to risk assessment criteria to generate a risk assessment. In some cases, the risk assessment criteria includes a plurality of attributes of the application, with the attributes indicating potential vulnerabilities of the application. A representation of the risk assessment may be generated across at least some of the attributes based on the risk assessment comparison. The risk assessment representation may then be updated based on monitoring of the security and compliance evidence for the application.

20 Claims, 7 Drawing Sheets

SOFTWARE RISK ASSESSMENT

BACKGROUND

Users and procurers of software applications, particularly those in regulated industries, generally seek assurance that the software products they want to procure will not result in vulnerabilities to customer data and security breaches of that data. These procurers gain assurance by assessing the security and compliance posture of the software before procurement. They typically try to obtain information such as how data will be handled by the software application, and what protections are provided for critical vulnerabilities for the software application and data it manages, which other services may depend upon. Currently, users and entities seeking to obtain software applications from producers do not have a centralized repository that provides up-to-date, evidence-backed information required for software risk assessments.

Instead, these users and entities request this information from the vendors or producers for each assessment, such as via a questionnaire, (e.g., a 150 point checklist) covering the product's key security and compliance attributes. Users then require evidence to validate the vendor response, which typically sets off a series of back-and-forth discussions between the user's and vendor's security and product teams and can delay assessment by a meaningful amount of time (e.g., typically up to 10 additional weeks). Due to tight timelines and resource constraints, often users can perform validation for only a few mission-critical products, and they have to trust the vendor's self-attested information for the rest. Because this is a 'point-in-time' assessment, users therefore need to build manual processes (including periodic re-assessments) to track changes to the software's security and compliance posture post procurement. For vendors, responding to user requests is repetitive, time-consuming, and requires coordinated efforts a number of different teams and users.

BRIEF DESCRIPTION OF THE DRAWINGS

Various techniques will be described with reference to the drawings, in which.

DETAILED DESCRIPTION

Figure 1:
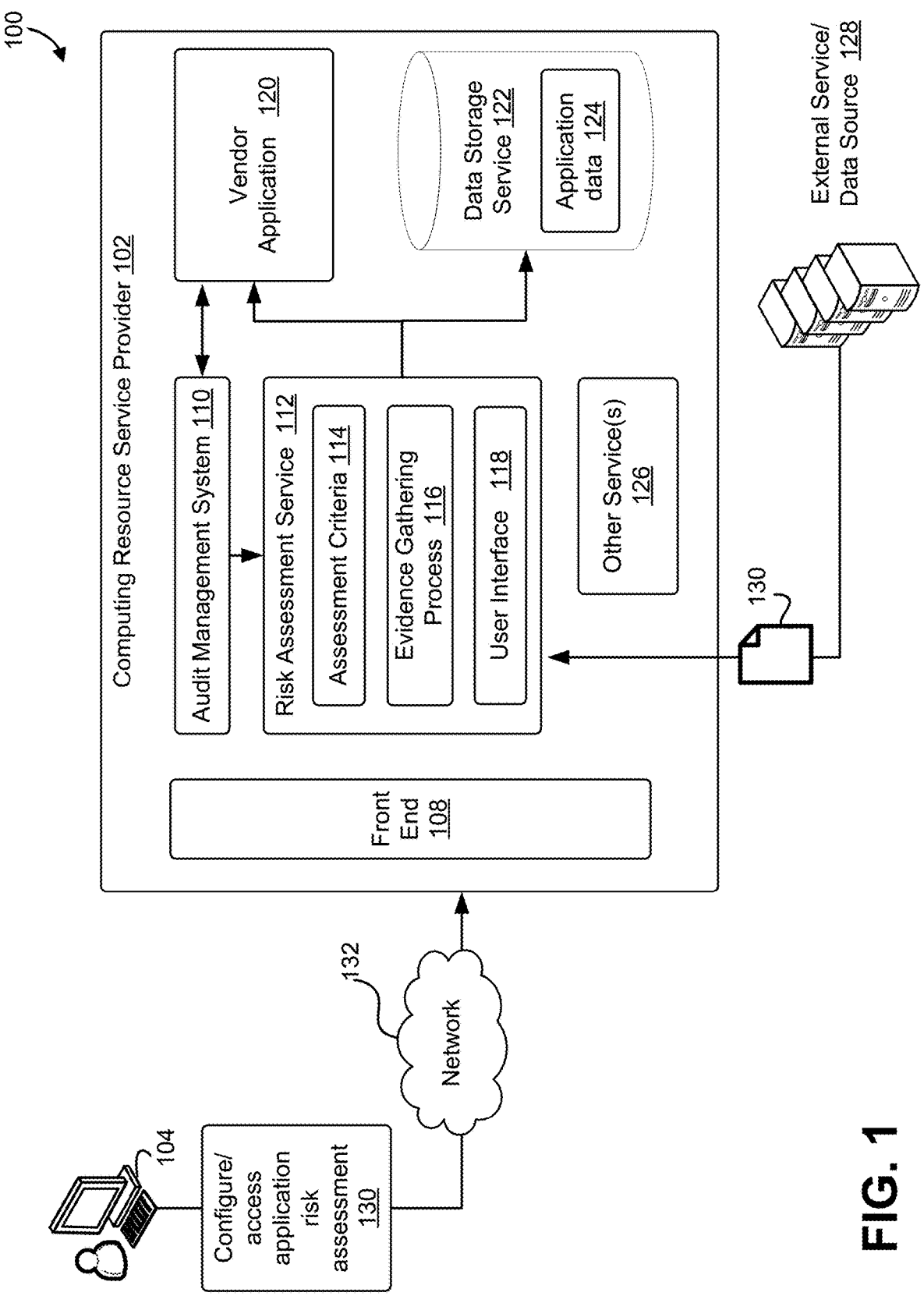
FIG. 1 illustrates an example environment in which the described techniques can be practiced, according to at least one embodiment.

Systems and methods are described herein for performing a risk or other assessment on software applications utilizing various evidence sources. Entities, including private organizations, government agencies, and the like, utilize various applications and pieces of software to operate, perform public functions, etc., where those applications may interface with various data, including sensitive data, such as health information, financial information, etc. These entities typically seek some assurances that the applications they are employing meet various standards for data security and risk mitigation. The described techniques address a number of challenges with the typical manual process of asking an application producer or vender a large number of questions concerning the risk and vulnerabilities of the application, waiting for responses, and having to manually update the assessment over time. The described techniques do so by automatically gathering evidence from a number of sources, and in some cases providing monitoring of the evidence sources to provide updates on the risk assessment of the application. Importantly, the described techniques can gather operational data from the application executing in a runtime environment, such as provided by a computing resource service provider, to provide the most current and accurate risk assessment data across a number of different variables or control sets (e.g., an assessment criteria). In some cases, the described techniques may also utilize other evidence sources to assess the risk of the application, including obtaining compliance certifications from various external organizations, and/or self-attestations and other data generated by the application vendor or producer. In some cases, one or more of these evidence sources may be monitored, such as continuously, to update the risk assessment and/or provide notifications to the operator utilizing the application of changes in security and/or increased vulnerabilities of the application. Utilizing one or more of the above-described features, the described techniques may provide a platform to enable more robust risk assessment of various applications.

In some aspects, the described systems and techniques gather evidence-backed security and compliance information financial risk or posture information, and/or to legal considerations or compliance information for software from vendors, present that information in a dashboard or other interface, and provide notifications to monitor changes to various controls or attributes of that information. The described techniques provide a structured and automated way to access the security posture, compliance status, and supporting evidence for applications through a user interface or dashboard that enables interacting with various levels of information relating to risk assessments and data security. In some cases, the described techniques automate evidence gathering using an audit management system to present current, validated information. The described systems may also extract relevant evidence from certified audit reports such as ISO-27001 or SOC-2. The ability to gather this evidence reduces the need for back-and-forth discussions enabling entities to complete assessments within a few hours instead of months. The described systems enhance data security by obtaining external evidence, not just an application developer's own self-assessment. In addition, the described techniques may reduce or eliminate the need for periodic re-assessments, as entities will have access to the dashboard and reports post-procurement and can also receive notifications to monitor changes in the application's security posture.

In some aspects, upon obtaining the compliance and security data or evidence from one or more sources, the evidence may be compared and mapped to a number of different variables or indicators (e.g., an assessment criteria) relating to data security, risk management, financial risk or posture, or to legal considerations or compliance. In some cases, the variables may be controls that are placed on the data, such as whether the data is encrypted at rest and in transit, where the evidence may indicate whether the controls are active or in place. Different variables or controls may be organized into control sets based on the type of category they fall into, such as one or more of audit and compliance, data security and privacy, risk management and incident response, access management, security policy, application security, business resilience, end user device/mobile security, infra security, and human resources. The evidence may be mapped to individual variables or controls within these broader categories, where the indicator may specify from which evidence source it originates, such that one or more of data obtained from the application executing in a runtime environment, a compliance report, or a self-attestation may indicate whether a certain control is active for the application. The evidence may be compared/mapped to the criteria to generate a risk assessment comparison. A representation of the risk assessment of the application (e.g., via a user interface) may be generated across at least some of the criteria (e.g., for variables where evidence is available). In this way, various evidence from various sources may be coherently and comprehensively gathered, organized and presented to give an accurate picture as to an application's potential vulnerabilities.

In some cases, one or all of the available evidence sources may be monitored, such as periodically, aperiodically, or continuously, to detect if any changes have occurred in the evidence. In some cases, the risk assessment representation may be updated based on detected changes in the evidence. The risk assessment representation may be updated in real-time or near real time compared to when the changes in evidence are detected, or may be updated periodically, such as at a regular interval. In yet some cases, the changes in evidence may be analyzed to determine if any immediate notifications or alerts need to be generated to prevent any compromising events to the application or data managed by the application. In yet some cases, one or more mitigation actions may be automatically triggered in response to configurable detected events as indicated by changes in the evidence.

In some aspects, data generated for a risk assessment of a first application, such as in response to a first request, may be used to form a second risk assessment for the same application (e.g., a different instance or implementation of the application) for a second request. In some cases, the described systems may support publishing questions concerning the application and the vendors responses, or responses from various other sources. In some cases, this information may be provided to related risk assessments, such as in the example described above. In yet some cases, natural language processing may be utilized to identify similar questions that have been asked concerning the application from different requests. The corresponding responses may then be provided with related risk assessments, and in some cases, in response to specific questions or requests about a risk assessment of the application.

To protect sensitive information, in response to receiving a request to view a risk assessment of an application, the described system may redact portions of the risk assessment to provide responsive to the request. In some cases, a non-disclosure agreement or similar agreement may be provided in response to the request, such that the risk assessment is only provided if the terms to the non-disclosure agreement are agreed to.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) improved and more robust security assessments of applications to identify potentially vulnerabilities in applications to ultimately reduce data breaches; (2) improved efficiency in generated a risk assessment of applications to reduce network bandwidth usage; (3) a more efficient user interface for accessing risk assessment data, and (4) other advantages as will be made apparent in the rest of this disclosure.

FIG. 1 illustrates an example environment 100 in which a risk assessment service 112 may be provided by a computing resource service provider 102. A client 104 may interact with the computing resource service provider 102 via a front end 108 of computing resource service provider 102 over one or more networks 106 to interact with various data and services, such as through one or more of a risk assessment service 112, an audit management system 110, a vendor application 120, a data storage service 122, and/or other services 126, as will be described in greater detail below.

Client 104 may refer to a client computer system or computing device connected to a server (e.g., computing resource service provider) over a network 106. In some cases, client 104 refers to a user or operator of a client computer system and may be an employee of an organization that utilizes a computing resource service provider 102 to interact with various forms of data, such as application data/data source 124 through one or more vendor applications 120, in combination with risk assessment service 112, audit management system 110, storage service 122, and/or other services 126.

Client 104 may submit a request 130 for access to various computing resources (e.g., services or computing resources thereof) of computing resource service provider 102. The request 130, in some examples, is a web service application programming interface request (also referred to simply as a web service request), may be received by a service of the computing resource service provider 102. As illustrated, the client 104 may submit a request 130 to configure, access, and otherwise interact with a vendor application 120 and risk assessments of that application, as provided by risk assessment service 112. In some cases, the request 130 may be directed to one or more services provided by the computing resource service provider 102, and may include a request to submit an application and related information to generate and/or configure a risk assessment of the application, such that may be made available to other users or entities desiring to utilize the application. In yet other cases, the request 130 may include a request to access a risk assessment of an application, such as may be provided through a user interface 118 of the risk assessment service 112. In yet some cases, the request 130 may include other requests to access, store, or evaluate applications 120 that may interact with application data 124.

In some examples, request 130 may include one or more of: a destination of the software code of the application, various information or evidence relating to vulnerabilities, risk assessment, and/or controls implemented by the application, one or more compliance reports generated by various organizations, locations of the compliance report or reports, a self-attestation of the application from the producer of the application, and various other information relating to execution and evaluating the application for vulnerabilities, data security, etc. In some cases, the request may include an indication of what variables or controls are pertinent to the application, evidence pertaining to those variables or controls, and various other information as may be useful in providing the application to others for execution and enabling the risk assessment service 112 to generate a thorough and accurate risk assessment of the application.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a risk assessment service 112, an audit management system 110, a vendor application 120, a data storage service 122, and/or other services 126 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106.

In some cases, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 7. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a risk assessment service 112, an audit management system 110, a vendor application 120, a data storage service 122. Each of these services may provide ways for a customer to interact with various forms of data, including using the one or more services to assess risk and vulnerabilities of various applications.

The risk assessment service 112 may be a collection of computing resources or processes configured to generate and process risk assessment for applications, such as vendor application 120 that may be executed in a runtime environment provided by the computing resource service provider 102 and may access application data 124, which as illustrated, may be managed and stored via a data storage service 122 also provided by the computing resource service provider 102. In other cases, application 120 may access data external to the computing resource service provider 102. In yet some examples, the application for which the risk assessment is produced may also be executed external to the computing resource service provider 102. The risk assessment service 112 may generate an assessment of risk or other attributes of an application based on various evidence sources. As used herein, this assessment may be generally referred to as a risk assessment. It should understood, however, that the assessment may not be limited to different assessing risks of an application, but may rather provide a summary of various attributes of an application based on data security, vulnerabilities, or based on other attributes, such as relating to financial data or information or legal compliance, etc.

The risk assessment service 112 may obtain an application 120 for performing a risk assessment, such as associated with a request 130. The risk assessment service 112 may coordinate and direct obtaining evidence or data relating to various attributes of the application from various sources, via an evidence gathering process 116. In some aspects, the risk assessment service 112 may coordinate and/or instruct the audit management system 110 to evaluate the application 120, as it is executed in a runtime environment provided by the computing resource service provider 102. In some cases, the risk assessment service 112 may initiate executing of the application itself, such as through audit management system 110, and/or other services 126. In other cases, the risk assessment service 112 may simply receive a notification that the application is running, and coordinate with the audit management system 110 to obtain operational data from the application. In some cases, the evidence gathering process 116 may obtain data from one or a number of different sources, including self-attestation data from a vendor or producer of the application itself, one or more compliance or other reports from an external service or data source 128, and/or operational data of the application executing in a runtime environment, such as may be collected by an audit management system 110. It should be appreciated that external service or data source 128 may including any of a variety of certifying or examination entities, relating to data security, best practices or requirements in certain industries, such as legal, financial (e.g., financial reports), health care, other application evaluations (e.g., ScoreCard), and so on. As used herein, external service or data source 128 may contemplate any external organization or data source that may provide evaluations of applications.

The risk assessment service 112 may also include a assessment criteria 114, which may be a collection of computing resources or processes for configuring what types of controls and variables (e.g., assessment criteria) are analyzed and collected for a given application, and what evidence maps to those controls and variables. More detailed examples of different variables and controls which may be determined for an application will be described in greater detail below in reference to FIG. 4. In some cases, the assessment criteria 114 may instruct the audit management system what types or what data to collect as evidence to provide indications of the various controls that may or may not be utilized by the application. In yet other examples, the assessment criteria 114 may map whatever evidence is provided by the audit management system 110 to the assessment criteria to be used in generating a risk assessment. In yet some cases, the data and/or types of data collected by the audit management system 110 may be standardized or set by default, with options, provided through user interface 118, to modify the data gathered and/or the variables or controls that are relevant to a particular application 120 or assessment thereof. A more detailed example of the risk assessment service 112 will be described in greater detail below in reference to FIGS. 2-3.

The audit management system 110 may be a collection of computing resources configured to observe an application, such as vendor application 120, and collect operational and other data that may be used to generate a risk assessment of the application. The audit management system 110 may access a data source, such as data sources 124, from a data storage service 122 provided by the computing resource service provider 102, and/or via other data sources maintained, stored, or accessed external to the computing resource service provider 102. The audit management system 110 may perform one or more of the following functions: collecting and storing logs, determining what types of controls are active in managing data by the application, generating metrics relating to operation of the application, aggregating metrics, etc., on the data. The audit management system 110 may collect or generate data and metrics pertaining to the application 120, which may be used by the risk assessment service to generate a risk assessment of the application.

The risk assessment service 112 may additionally include or provide a user interface 118, which may structure and provide access to the various indications of different attributes of a risk assessment of application 120. A more detailed example of an organizational structure used to represent a risk assessment, which may be provided by user interface 118, will be described in great detail below in reference to FIG. 4

In some examples, the computing resource service provider 102 may provide data storage through a data storage service 122 to store and manage large volumes of data, including various types of data as may be used by various applications 120, which may collectively be referred to herein as a data source or application data 124. In some cases, the data storage service 122 may interact with application 120, audit management system 110, risk assessment service 112, and/or other service 126 to enable risk assessments to be generated, updated, and accessed relevant to data stored by the data storage service 122. Data storage service 122 may be an on-demand data storage service, such as an object-based data storage service, and may be configured to store various forms of media. The data storage service 122 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 122, which may collectively form a data source 124, may be organized into data objects, The data storage service 122 may store numerous data objects of varying sizes. The data storage service 122 may operate as a key value store that associates data objects with identifiers of the data objects which may be used by the client 104 to retrieve or perform other operations in connection with the data objects stored by the data storage service 122. Access to the object-based data storage service 122 may be through application programming interface (API) calls to the service or via an interface, such as a graphical user interface (GUI).

In some aspects, data source 124 may include data obtained from a specific application or service, such as virtual computing resources including virtual machines, containers, etc., data storage services, and other services or entities running within or outside of the computing resource service provider. In some cases, the data source 124 may include any of a number of different data sources and different types of data sources, such as from a Software as a Service (SaaS) application, a relational database or service, risk assessment service, audit management system, or other data source. In some cases, the customer, such as in a request 130, may specify the data source 124, such as via any type of an identifier, including IP address, resource name, such as may be assigned by a computing resource service provider 102 that provides the service or data source, or via other types of identifiers. In yet some cases, the data storage service 122 may store part or all of risk assessments generated by the risk assessment service 112. In some cases, the data storage service 122 may operate as a key value store that associates data objects with identifiers of the data objects which may be used by the client 104 to retrieve or perform other operations in connection with the data objects stored by the data storage service 122. Access to the data storage service 122 may be through application programming interface (API) calls to the service, for example from either directly from client 104, or via the computing resource service provider 102. It should be appreciated that the data storage service 122 may additionally or alternatively provide non-object-based data storage, such as block data storage, table-oriented data storage, relational databases, file-based storage, and the like.

Figure 2:
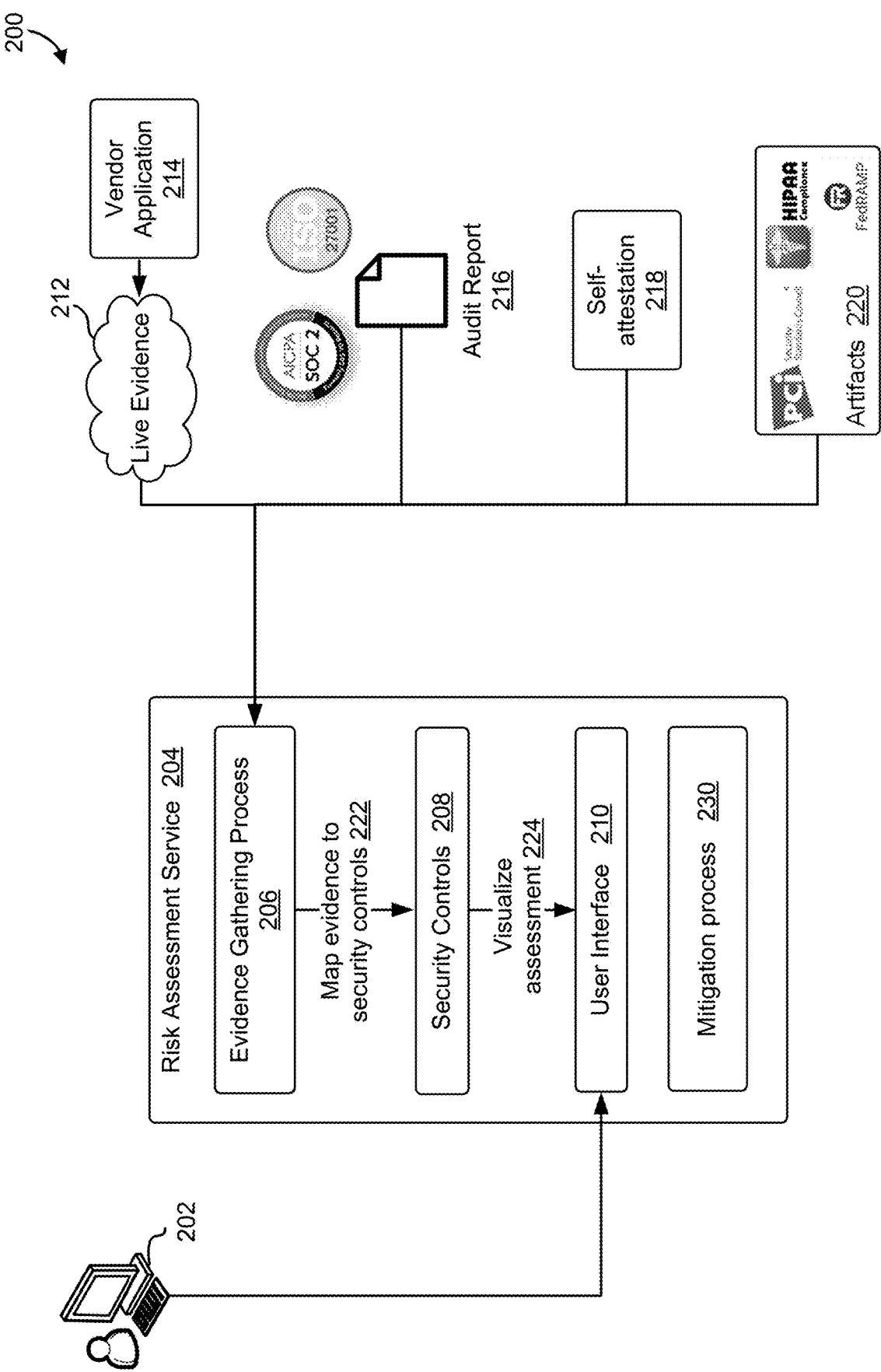
FIG. 2 illustrates an example of a risk assessment service, according to at least one embodiment.

FIG. 2 illustrates a more detailed example of a risk assessment service 204, which may interact with various data or evidence sources to obtain data for generating a risk assessment of an application. Risk assessment service 204 may incorporate one or more aspects of risk assessment service 112 described above in reference to FIG. 1. As illustrated, a client device 202 may interact with a risk assessment service 204 to obtain a risk assessment of an application 214, or an update to a risk assessment already performed for the application 214. In order to generate and compile the risk assessment, the risk assessment service 204 may obtain evidence of compliance, vulnerabilities, and potential risks associated with the application from one or a multitude of sources, including live evidence from the application executing in a runtime environment, audit reports 216, self-attestations 218, and/or artifacts 220.

The risk assessment service 204 may obtain the application code for the application 214, and coordinate with one or more other systems to load the application in a runtime environment to assess the application 214 while it is executing or thereafter. In some cases, the runtime environment may be provided by a computing resource service provider that also provides or instantiates the risk assessment service 204. In these cases, access to data from the application may be established under a push or pull scheme, such that data is obtained from the executing application either by actively requesting data from the application 214, or establishing in the runtime environment triggers or cues for the application itself, or a service executing the application, to send data from the application to the risk assessment service 204, in the form of live evidence 212. In cases where the runtime environment for the application is external to the computing resource service provider, a pull scheme may typically be utilized, as configuring an external runtime environment may present undesired difficulties or further customization. However, it should be appreciated that a push scheme may also be unutilized in these scenarios.

The live evidence 212 may include any of a variety of information that may be obtained or observed while the application is executing in a runtime environment, or thereafter. The live evidence may pertain to compliance with various standards set by various organizations and/or laws, such as HIPAA, FEDRAMP, PCI, and/or any of the following general categories: audit and compliance, data security and privacy, risk management and incident response, access management, security policy, application security, business resilience, end user device/mobile security, infra security, and human resources. In some cases, the live evidence 212 may pertain to information used to ensure or evaluate compliance with any standards set by various organizing, including HIPAA, FEDRAMP, PCI, audit reports such as ISO or SOC-2, other audit reports, other standards set for various industries, including health organizations, financial institutes, and various other data. Live evidence 212 may include operational data pertaining to how the application accesses, stores, and transfers data, what the data includes, and so on. It should be appreciated that live evidence 212 can include any data that is useful in evaluation an application for compliance, security, etc.

One benefit of gathering live evidence 212 from the application in a runtime environment is to observe exactly how data will be managed by the application, including what communications channels are used to obtain and transmit data, what storage devices or services are used to temporarily store the data, such as when it is being processed by the application, and other variables that are dependent upon the actual environment in which the application is executed.

The evidence gathering process 206 of the risk assessment service 204 may similarly obtain evidence from one or more audit reports, 216, such as SOC-2, ISO, and various other audit reports that may typically be used to evaluate applications and software code. Similarly, one or more self-attestations 218 provided by the producer of the application may similarly be obtained. The self-attestations 218 may take a variety of forms and may include a variety of information, including statements indicating what controls are placed or implemented within the application to ensure security and compliance with various standards, as made by the producer or vendor of the application. In addition, the evidence gathering process 206 may obtain one or more compliance reports or artifacts 220, from various sources, that indicate compliance of the application with one or more standards, sch as HIPAA, FEDRAMP, PCI, and others, such as relating to financial reports, credit scores, legal compliance, etc.

The evidence gathering process 206 may extract various pieces of information from one or all of these evidence sources and map the evidence to various variables and controls, as structured via the security controls component 208, at operation 222. In some aspects, individual variables in the risk assessment may have an indication for each evidence source, where the data from the different evidence sources is separate and represented separately, to enable more precise evaluation of an application by a potential user of the application. A more detailed example of a data structure for representing risk assessment data for an application will be described in greater detail below in reference to FIG. 4.

In some cases, operation 222 may include utilizing a number of rules that identify which evidence sources and what information maps to specific variables or controls in the security controls/assessment criteria. In some cases, the set of rules may be manually entered or based on prior assessments performed by the risk assessment service 204. In yet some cases, such as when evidence is mapped from a compliance report or audit report, templates may be used to map individual pieces of data at certain locations within those reports to various controls/criterion in the assessment. In yet some examples, machine learning techniques may be utilized to develop, train, and improve models for mapping certain key words and phrases, such as in certain locations in a document, and/or taking into account proximity of words to other words, to develop a mapping. In some cases, mapping the obtained security and compliance evidence to the risk assessment criteria to generate the risk assessment may be performed using at least one trained model, wherein the at least one trained model includes indicators of the obtained security and compliance evidence that correspond to individual attributes of the plurality of attributes of the application. Various machine learning techniques may be utilized for this process, as are known in the art.

In some cases, operation 222 may include mapping a plurality of pieces of evidence, either from one data source or across multiple data sources 212, 216, 218, and/or 220, to one control or variable, as used in the assessment criteria/security controls 208. In some cases, this may include combining similar values into one combined value, noting any disagreement between the sources, providing a confidence score in a given value, and various other schemes, as may be used to efficiently convey values for different variables or controls.

Upon mapping the evidence to various variable and security controls, the security controls component 208 of the risk assessment service 204 may then generate a representation, such as an interactive and/or graphical representation of the various security controls and variables evaluated for the application, at operation 224, and provide the representation to a user interface 210. In some cases, the security controls component 208 may not be limited to security or other risk assessments, but rather may include a more general assessment criteria, implemented in a similar way, as described above in reference to FIG. 1.

In some cases, the user interface may include a dashboard interface that structures the evaluation or risk assessment information into one of multiple layers. In some cases, the different layers may increase in specificity as they are selected. In one example, the dashboard may include various categories of a risk assessment performed for an application. Upon selecting a given category, one or more control sets or logical groupings of controls and/or variables or indicators that pertain to the category may be provided, including a number of individual controls or variables. Upon selecting an individual control or variable, a summary of the evidence collected for that specific control or variable my be presented. A more detailed example of a data structure for representing risk assessment data for an application will be described in greater detail below in reference to FIG. 4. The described hierarchical organization of controls and attributes for assessing risk of an application may more effectively communicate risk assessment information about an application, in a way that communicates desired/important information, and that utilizes less user interface space and requires less selections to identify and access desired information.

A similar process may be used to update an already generated risk assessment, based on any of the evidence sources. The process for updating the risk assessment may be performed on the application as being executed by the user of the application. In this scenario, the risk assessment service 204 may either request updated information from one or more of the evidence sources 212, 216, 218, and/or 220, or receive updates from any of these evidence sources via a push mechanism. In some aspects, the risk assessment service 204 may also include a mitigation process or component 230. The mitigation process 230 may obtain updated evidence information and compare that updated evidence information to a set of configurable thresholds for determining if one or more mitigation actions need to be taken to reduce, prevent, or mitigate potential security breaches or other unwanted risk events from occurring while the application is executing. In some aspects, the mitigation process 230 may trigger action to be taken by a security system, such as may be provided by a computing resource service provider 102. In some cases, upon detection an action warranting mitigation action, the mitigation process 230 may generate a ticket or other notification that can initiate a security action to be to be performed to address the detected event.

Figure 3:
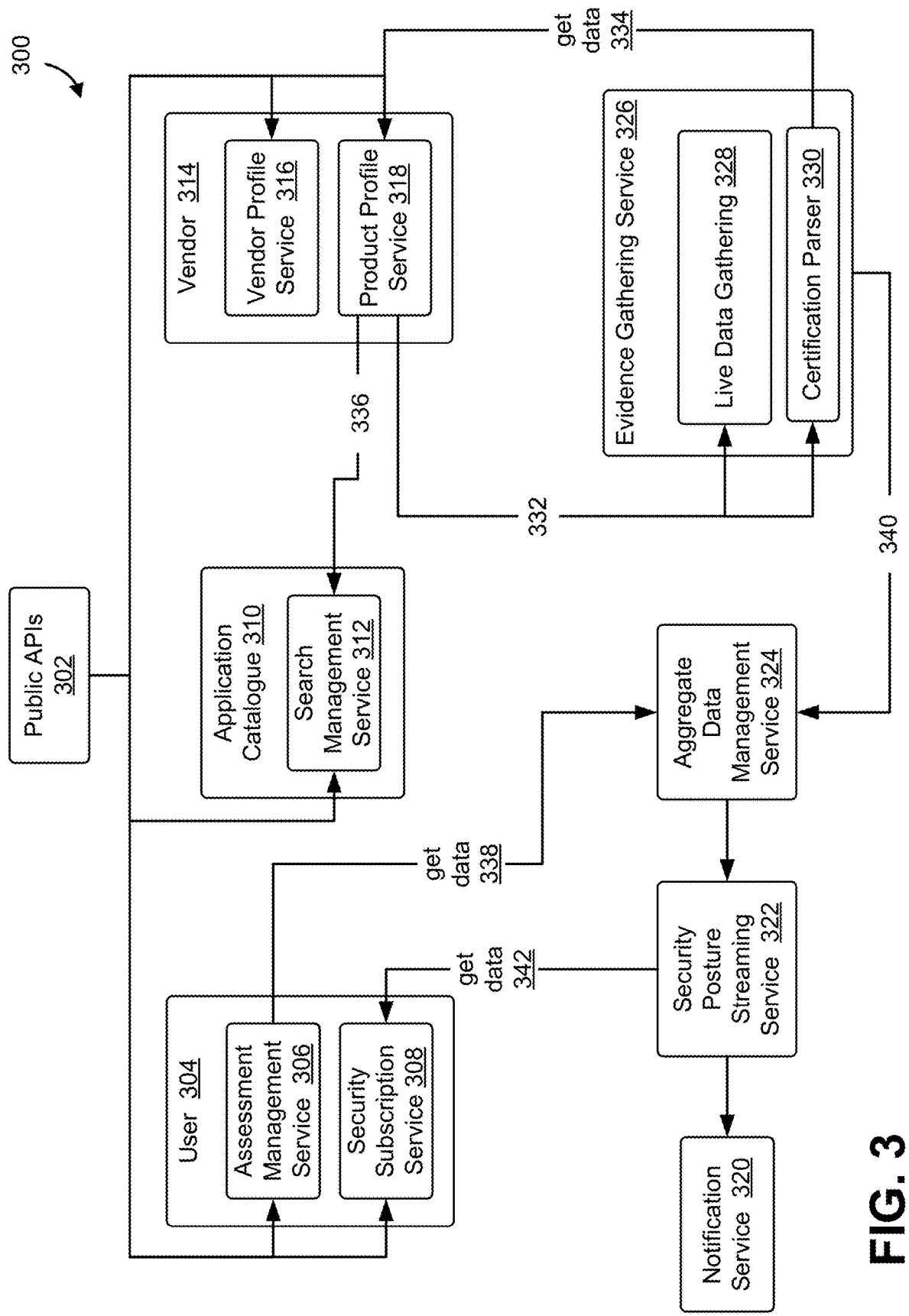
FIG. 3 illustrates example communications between components of a risk assessment service, according to at least one embodiment.

FIG. 3 illustrates example interactions between components or different services 304-330 of a risk assessment service (collectively referred to herein as risk assessment service 300). Components 304-330 of the illustrated risk assessment service 300 may incorporate one or more aspects of risk assessment service 112, 204 described above in reference to FIGS. 1 and 2. In some cases, some or all of components or services 304-330 may be provided by the risk assessment service 112, 204 and/or computing resource service provider 102. As illustrated various users of the risk assessment service 300 may interact with the service 300 through public application programming interface (API) calls, such as may be directed to a user or acquirer interface 340, a vendor interface 314, or an application catalogue 310, to select different applications as may be managed by the risk assessment service 300.

In some aspects, a vendor may interface with a vendor profile service 316 of the vendor interface 314 to establish and/or modify a profile of the vendor as maintained by the risk assessment service. The vendor may interact with the vendor profile service 316 by submitting information about the vendor (e.g., contact information, history information including what applications them have produced, various credentials indicating their ability to create trustworthy applications, etc.) via one or more API calls so that a profile may be created and/or modified pertaining to the vendor. The profile may be accessible to users to aid them in assessing various applications for use. Similarly, the vendor may also interact with the product profile service 318, also part of the vendor interface 314, for providing information describing the one or more applications offered by the vendor. The vendor may interface with the product profile service 318 via one or more API calls that include information about the application, self-attestations, answers to questions concerning the application, compliance certificates, audit reports, pointers to the application in a production or runtime environment, and various other information.

The risk assessment service 300 may also include an evidence collection service or process 326, which may incorporate one or more aspects of evidence gathering process 116, 206. The evidence gathering service 326 may include a live data gathering process 328, which may obtain operational data from an application in a production or runtime environment, and a certification parser 330, which may obtain various certificates or compliance reports pertaining to the application as generated by one or more external organizations. The evidence gathering service 326 may collect data for a given application upon receiving an instruction, at operation 332, from the product profile service 318, which may generate the application assessment. The certificate parser 330 may extract relevant data from the obtained reports. The product profile service 318 may get the evidence data, collected by the evidence gathering service 326, at operation 334, to generate a risk assessment of the application. The product profile service 318 may then communicate the risk assessment to the search management service 312 of the application catalogue 310, at operation 336, to enable other users to identify and access the risk assessment of the given application, such as via one or more public APIs.

A user or potential acquirer of an application may access the user interface 304 to obtain various information about various applications and risk assessments of those applications generated by the risk assessment service via one or more API calls. The user interface 304 may include an assessment management service 306, which is responsible for obtaining evidence and risk assessments of various applications, such as through an aggregate data management service or process 324, via operation 338. In some cases, the aggregate data management service 324 may obtain evidence directly from the evidence gathering service 326, via a push or pull mechanism, at operation 340.

The user interface 304 may also include a security subscription service 308, which is responsible for monitoring an application, in a product or runtime environment, and providing notifications to a user of changes in the security profile of the application. The security subscription service 308 may obtain updates to evidence data and other risk assessment information through a security posture streaming service 332, which may obtain changes in the underlying evidence from the aggregate data management service 324, at operation 342. In some cases, the security subscription service 308 may continuously monitor the application. In other cases, the security subscription service 308 may monitor the application periodically (e.g., every hour, every 12 hours, every 24 hours, every week, etc.), or at a user defined interval. In some cases, the aggregate data management service 324 may obtain changes in evidence from the evidence gathering service 326 and push important updates to the security subscription service 308. In yet some cases, the security posture streaming service 322 may also send various changes in the evidence to a notification service 320, which may notify a user directly, and/or a security service to trigger and/or perform one or more mitigation actions to address the change in security evidence for the application.

Figure 4:
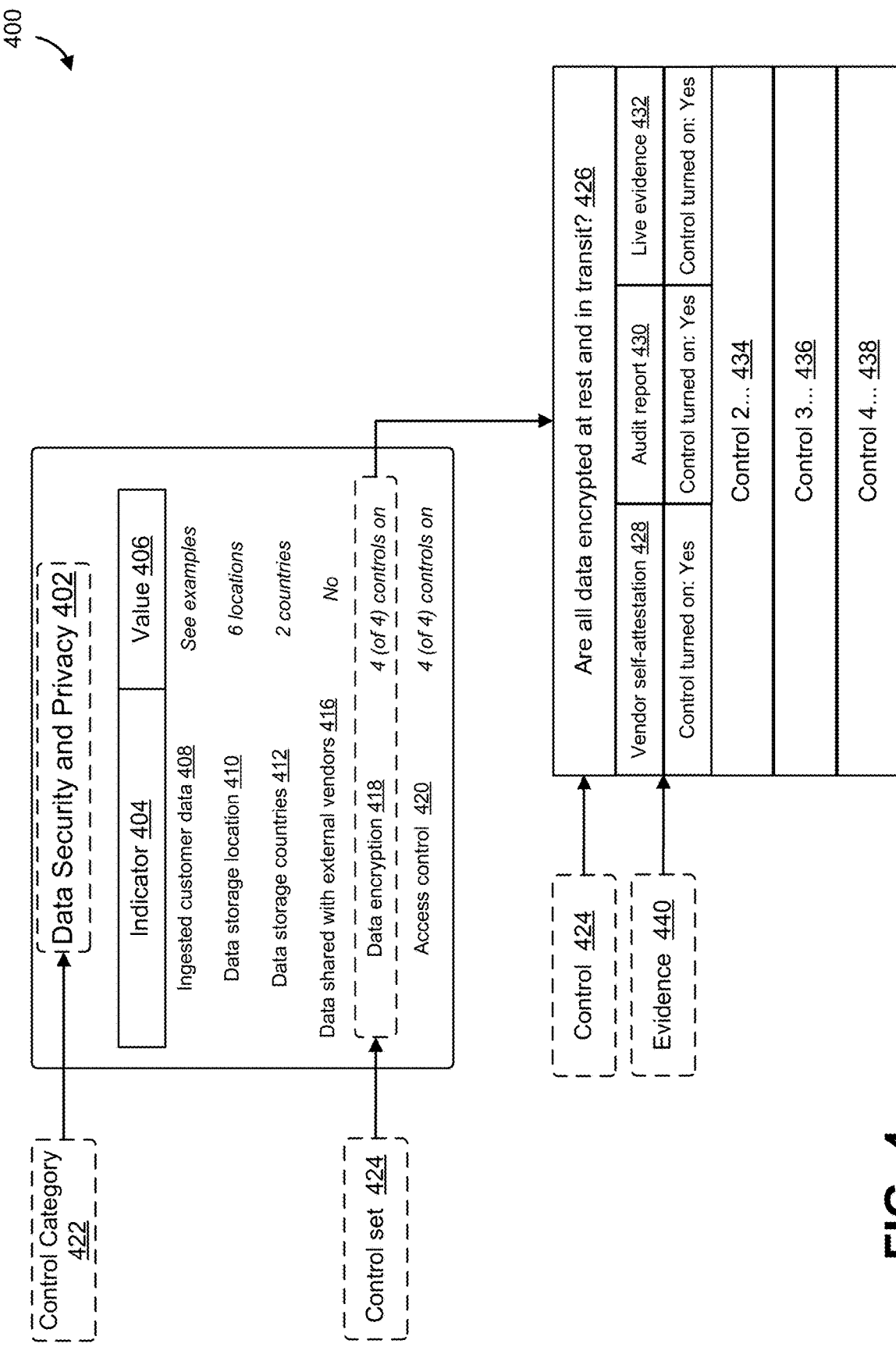
FIG. 4 illustrates an example of a control set, which may be used by the risk assessment service described in reference to FIGS. 1-3, according to at least one embodiment.

FIG. 4 illustrates an example data structure 400 representing a control set, which may be used by the risk assessment service described in reference to FIGS. 1-3 to evaluate an application and generate a risk assessment for that application. As illustrated, an application may be evaluated across a number of different categories, such as audit and compliance, data security and privacy, risk management and incident response, access management, security policy, application security, business resilience, end user device/mobile security, infra security, and human resources. These different categories may be structured in a hierarchical way to organize data pertaining to the given category into different variables or controls, and evidence pertaining to an answer or indication relating to the given variable or control.

In the example illustrated, a data structure 400 includes variables, controls, and. or control sets 408-420 relating to the category 422 of data security and privacy 402. Various indicators or variables (also referred to as a control set when plural) 404 may be provided with corresponding values 406, such as including ingested customer data 408, corresponding to a value of see examples, a data storage location 410 corresponding to 6 locations, data storage countries 412 corresponding to 2 countries, data shared with external vendors 416 with a corresponding value of no, data encryption 418 with a value of 4 out of 4 controls turned on or active, and access control 410 with a value of 4 of 4 controls active. In the illustrated example, the data encryption indicator may include 4 different individual controls, where data encryption 418 may be referred to as a control set 424.

The data encryption control set 418 may include a number of different controls 424, each with corresponding evidence values or indicators 440. For example, a first control 426 of data encryption control set 418 may include an attribute or control imposed on data used by the application: whether the data is encrypted at rest and in transit. Upon obtaining evidence from one or a number of evidence sources, the indicators for this control 426 may be populated. In the example illustrated, a vendor self-assessment 428 may indicate that this control is turned on, and similarly with audit report evidence 430 and live evidence 432. Each additional control 434, 436, 438 in the control set 424 may similarly have different evidence sources indicating the same or different values for a given control/variable.

In a similar way, various other categories, control sets, controls, and evidence may be organized in a similar data structure, which may facilitate efficient access to the risk assessment information. For example, audit and compliance information and evidence may include and/or be structured as follows:

| Control Set Name | Control Set - Sample Value | Control Name | Control Description | Manual attestation? | Control Sample Value | Sample Manual Evidence Document |
| --- | --- | --- | --- | --- | --- | --- |
| Certifications Completed | 2 Certifications | Specify the list of certifications that you have. Please upload a copy of the certificate. | Specify the list of certifications that you have. Please upload a copy of the certificate. | Yes | SOC2, ISO/IEC 27001 | SOC2 Type 2 report, or any audit report |
| Procedures ensuring compliance | 3 (of 3) controls on | Do you have a policy/procedure to ensure compliance with applicable legislative, regulatory and contractual requirements? | Specify if you have a policy/procedure to ensure compliance with applicable legislative, regulatory and contractual requirements. If yes, could you share details about the procedure/upload a manual evidence? | Yes | Yes | provide the policy document which covers our best practice requirements |
| | | Are internal audits done to track outstanding regulatory requirements? | Specify if internal audits are done to track outstanding requirements. If yes, how do you do it? | | Yes | provide the audit document used for the assessment |
| | | Is there a process to handle deviations and exceptions from compliance requirements? | Specify/establish if there is a process to handle exceptions/deviations from compliance requirements. If yes, please provide details on how you do it. | | Yes | Provide the SOP |
| Certification in progress | 1 (of 1) controls on | Do you have a roadmap to acquire additional certifications in the future? | Specify if there is roadmap for additional certifications in the future. If yes, provide name and approximate completion date for each certification. | Yes | Yes. PCI certification is in progress (ETA Q2'22) | Provide the roadmap with timelines for certification |

In some examples, data security and privacy information and evidence may include and/or be structured as follows:

| Control Set Name | Control Set-Sample Value | Control Name | Control Description | Manual attestation? | Control-Sample Value |
|---|---|---|---|---|---|
| Is sensitive and confidential data ingested | Logs from applications, infrastructure, and services | Establish a list of data that is needed from the customer for product functionality. | Describe all data that is ingested from the customer. Specify if sensitive and confidential data is ingested. | Yes | No sensitive and confidential data is ingested. This product only ingests non-sensitive information such as logs from applications, infrastructure, and services |
| Data storage location | Ohio-US, Oregon-US, Ireland-EU | Specify the list of countries and regions in which data is stored. | Where is the customer data stored? Please Specify the list of countries and regions in which data is stored. | Yes | Ohio-US, Oregon-US, Ireland-EU |
| Access Control | 5 (of 5) controls on | Do employees have access to unencrypted customer data? | Specify if employees have access to unencrypted customer data. If yes, explain why they'll have access. If no, explain how you control access. | | No. All data is encrypted when stored. Employees won't have access to customer data, but only data about usage. |
| | | Can customer data be accessed through mobile devices? | Specify if customer data can be access using mobile devices. If yes, explain why they'll have access via mobile and if there is a mobile policy in place. If no, explain how you control mobile access. | | No. No data is accessible via mobile devices. |
| | | Is customer data transmitted to countries outside the origin? | Is customer data transmitted to countries outside the origin? If yes, specify the list of countries to which customer data will transmitted or received | Yes | USA |
| | | Is customer data Shared with Third Party Vendors? | Is customer data Shared with Third Party Vendors? If yes, specify the list of third party vendors and their countries/region that you provide customer data to | Yes | No |
| | | Do you have policies/procedures in place to ensure that third party vendors maintain the confidentiality, availability, and integrity of customer data? | Specify if you have policies/procedures in place to ensure that third party vendors maintain the confidentiality, availability and integrity of customer data. If yes, could you share/upload a manual evidence of it? | | N/A |

-continued

| Control Set Name | Control Set-Sample Value | Control Name | Control Description | Manual attestation? | Control-Sample Value |
|---|---|---|---|---|---|
| Data Encryption | 4 (of 4) controls on | Are all data encrypted at rest and in transit? | Specify if all data is encrypted at rest and in transit. | | Yes. All data is encrypted at rest (when stored) and all data is communicated via a secure channel (TLS) |
| | | Do you use strong encryption algorithms? | Do you use strong encryption algorithms? If yes, specify what encryption algorithms (like RSA, AES 256) are used. | | Yes. AES-256 algorithm is used for encrypting the data |
| | | Are clients provided with the ability to generate a unique encryption key? | Can clients provide/generate their own unique encryption keys? If yes, please provide more details/upload evidence. | | Yes. Upload evidence about client's unique encryption keys |
| | | Are staff able to access client's encryption keys? | Please specify if your employees can access client's encryption keys. If yes, explain briefly why they'll have access to their keys. If no, explain briefly how you control access. | | No. Cryptographic keys are securely stored and periodically rotated. Employees don't have access to these keys. |
| Data storage and Classification | 7 (of 7) controls on | Do you back up customer data? | Specify if you back up customer data. If yes, please describe your back up policy (including details about how often backup is done, where the backup is stored, backup encryption and redundancy, etc.) | | Yes. Backup is done every 3 months, the backup is encrypted and stored in the same region as the customer data. The customer's support engineer will have access to restore the backup, but not the data in the backup. |
| | | Do you implement appropriate access controls for stored customer data? Provide your access control policies | Specify/Establish if appropriate access controls (like RBAC) is implemented for stored customer data. Please provide more details/manual evidence on how you control access to the data. | | Yes. Least privilege access controls is implemented to restrict access to customer data |
| | | Can customers customize access to their data including placing a "Legal hold" in case of incident? | Specify if customers can customize access to their data including placing a "Legal hold" in case of incident. | | Yes |
| | | Is customer's transaction details stored in DMZ? | Specify if customer's transaction details will be stored in DMZ. If yes, please explain briefly why it gets stored. | Yes | No |

-continued

| Control Set Name | Control Set-Sample Value | Control Name | Control Description | Manual attestation? | Control-Sample Value |
|---|---|---|---|---|---|
| | | Is Information classified according to legal or regulatory requirements, business value, and sensitivity to unauthorized disclosure or modification? | Specify/Establish if information is classified by sensitivity. If yes, could you upload manual evidence of this classification? | | Yes. Upload evidence of data classification |
| | | Is data segmentation and separation capability between clients provided? | Specify if different client's data is segmented. | | Yes |
| | | If Data segmentation and separation capability is present, do you have means to demonstrate legally sufficient data segmentation? | Establish if you can demonstrate sufficient data segmentation (legally) if required to do so. | | Yes. Upload evidence of data segmentation |
| Data Retention | 6 months | How long do you retain data? | Specify the duration of data retention. If the retention period differs by data classification/sensitivity, can you provide details on each retention period? | | 6 months. |
| | 3 months | How long do you retain data after buyers unsubscribe? | Specify the duration of data retention after customers unsubscribe. | | 3 months. |

Risk management information and evidence may include and/or be structured as follows:

| Control Set Name | Control Set-Sample Value | Control Name | Control Description | Manual attestation? | Control-Sample Value |
|---|---|---|---|---|---|
| Risk Assessment | 7 (of 7) controls on | Is there a formal process focused on identifying and addressing risks of disruptive incidents to the organization? | Specify if there is a process to identify and address risks that cause disruptive incidents for the organization. | | Yes |
| | | Is there a program/process to manage the treatment of risks identified during assessments? | Specify if there is a program/process to manage risks and their mitigations. If yes, can you provide more details about the risk management process? | | Yes. "We regularly review and remediate issues in order to address non-conformities. The following information is identified for any issue that affects our environment: Details of issue identified Root cause Compensating controls Severity Owner Near term path forward Long term path forward " |

-continued

| Control Set Name | Control Set-Sample Value | Control Name | Control Description | Manual attestation? | Control-Sample Value |
|---|---|---|---|---|---|
| | | Are risk assessments done frequently? | Are risk assessments done frequently? If yes, specify the frequency of risk assessments. | | Yes. Every 6 months |
| | | Is risk assessment done for third party vendors? | Specify if risk assessments are done for all third party vendors. If yes, how often is it done? | | Yes. Risk assessments are done every 6 months. |
| | | Is risk reassessment done when service delivery or contract changes? | Will risk assessments be done every time a service delivery or contract changes? | | Yes |
| | | Is there a process for management to knowingly and objectively accept risks and approving action plans? | Specify if there is a process for management to understand and accept risks, and to approve action plans and timelines to fix it. Does the process include providing details of the metrics behind each risk to the management? | | Yes. Details about risk severity and the potential issues if it's not mitigated is provided to management before they approve a risk. |
| | | Do you have measures in place to define, monitor and report risk metrics? | Specify if there is a process to define, monitor and report risk metrics. | | Yes |
| Incident Management | 6 (of 6) controls on | Is there a formal Incident Response Plan? | Specify if there is a formal incident response plan. | | Yes |
| | | Is there a 24 × 7 × 365 staffed phone number available to clients to report security incidents? | Is there a 24 × 7 × 365 staffed phone number/portal available to clients to report security incidents? Can you share the contact details? | | Yes. Please provide the contact details that can be used to report security incidents. |
| | | Do you report key activities? | Do you report key activities? What is the SLA for reporting key activities? | | Yes. All key activities will be reported within a week. |
| | | Do you have disaster recovery plans? | Specify if you have plans for recovery after an incident occurs. If yes, can you share details about the recovery plans? | | Yes. After an incident, recovery will be done within 24 hours. |
| | | In case of an attack, will relevant logs be available to customers? | Will logs related to their use be available to customers in case an attack/incident occurs? | | Yes |
| | | Do you have a security bulletin that outlines latest attacks and vulnerabilities affecting your applications? | Specify if you have a security bulletin that outlines latest attacks and vulnerabilities affecting your applications. If yes, can you provide the details? | Yes | Yes. Provide details about the security bulletin for threats and vulnerabilities. |
| Incident Detection | 4 (of 4) controls on | Is there comprehensive logging to support the identification and mitigation of incidents? | Specify if there is comprehensive logging enabled. Identify the types of events that the system is capable of logging. | | Yes. The following events are logged: applications, device, and AWS services such as CloudTrail, Config, VPC Flow Logs |
| | | Are logs monitored for unusual/suspicious behavior? Is there | Specify if regular security monitoring is done. If yes, does it include log monitoring | | Yes. All logs are monitored for unusual behavior such as multiple |

-continued

| Control Set Name | Control Set-Sample Value | Control Name | Control Description | Manual attestation? | Control-Sample Value |
|---|---|---|---|---|---|
| | | regular security monitoring done? | for unusual/suspicious behavior? | | failed logins, login from an unusual geolocation, etc. |
| | | Do you have detection mechanisms in place? Are there alerts on unusual/suspicious activities? | Specify if tools/mechanisms are in place for detecting suspicious behavior. If yes, will alerts be raised if a suspicious behavior was detected? | | Yes. Alerts will be raised and investigated. |
| | | Is there a process to identify/detect and log subcontractor information security, privacy and/or data breach issues? | Specify if there is a process in place to identify/monitor third party vendors/subcontractors for data breach or security issues. | | Yes |
| SLA for Incident Notification | 7 days | What is the SLA for sending notification about incidents/breaches? | What is the SLA for sending notification about incidents/breaches? | | 7 days |

Access management information and evidence may include and/or be structured as follows:

| Control Set Name | Control Set-Sample Value | Control Name | Control Description | Manual attestation? | Control-Sample Value |
|---|---|---|---|---|---|
| Secure Authentication | 10 (of 10) controls on | Do you support password-based authentication to access the production environment? | Specify if password authentication is enabled to access the product environment. | | No |
| | | Does the application require/support password-based authentication? | Specify if password authentication is enabled for the application. | Yes | No |
| | | Do you get personal data (other than name or email ID) in user ID? | Specify if personal data other than name or email address is used in user ID. If yes, what data will be used? What use case is it used for? | Yes | No |
| | | Is SSO enabled to access the production environment? | Specify if SSO can be used with the application. If yes, what tool is used for SSO? | | Yes |
| | | Is two factor authentication required to access the production/hosted environment? | Specify if two factor authentication (2FA) is required for access to production environment. If yes, what tool is used for 2FA? | | Yes |
| | | Does the application support two factor authentication? | Specify if two factor authentication (2FA) can be used with the application. If yes, what tools can be used for 2FA? | Yes | |

| Control Set Name | Control Set-Sample Value | Control Name | Control Description | Manual attestation? | Control-Sample Value |
|---|---|---|---|---|---|
| | | Is the customer's account locked if there are multiple failed logins? | Specify if account lockout is enabled if there are multiple failed logins. If yes, specify the number of tries after which account will be locked out. | Yes | Yes. Account is locked out after 5 times |
| | | Is root user used only by exception to access the production environment? | Specify that the root user is only used by exception. If yes, can you establish the cases it'll be used for? | | Yes. Root user is used only for device management purposes. All such accesses are logged and monitored |
| | | Does Root user require multi-factor authentication (MFA)? | Specify if logging in as root user requires multi factor authentication. If yes, what tool is used for MFA? | | Yes. Root users are required to use MFA to login. Their root credentials is distinct from their normal corporate credentials |
| | | Is remote access to the production environment permitted and is the access secure? | Specify if the application permits remote access. Is yes, what is remote access used for? Is the access secured (for example: will key based authentication be used and will the communication be over encrypted channels)? | | Yes. Remote access is used for device management purposes. We require multi-factor authentication over an approved cryptographic channel when accessing the production environment remotely |
| Credential management | 2 (of 4) controls on | Does the application have a strong password policy? Does the password policy require changing it at frequent intervals? | Specify/Establish if a strong password policy is present. Does it require password change at frequent intervals? | | N/A |
| | | Does the password policy require passwords to be encrypted in transit and to be hashed with salt when stored? | Specify if passwords are encrypted in transit and when stored, is the password hashed with salt. If yes, can you provide more details? | | N/A |
| | | Do you use secrets management service? | Specify/Establish if there is a secrets management in place. If yes, can you provide more details? | | Yes. All credentials are stored in a secret management service. They are rotated periodically. |
| | | Are credentials included in the code? | Specify if credentials are included in the code. If yes, can you provide more details? | | No |
| Access Control Policy | 5 (of 5) controls on | Do you follow least privilege access policy for users to access production environment? | Specify/Establish if least privileges are assigned to users. If no, how do you control access? | Yes | Yes |

-continued

| Control Set Name | Control Set-Sample Value | Control Name | Control Description | Manual attestation? | Control-Sample Value |
|---|---|---|---|---|---|
| | | Are all access policies in the production environment reviewed regularly? | Specify if all access policies are reviewed regularly. If yes, can you provide more details on how often the policies are reviewed? | | Yes. All access policies are reviewed every 3 months |
| | | Are there separate accounts for hosting critical and shared services? | Specify/Establish if there are separate accounts for hosting critical and shared services. | | Yes. Upload evidence for account segregation. |
| | | Can customers configure user & security policies for sign in? | Specify if customers can configure which users (from the customer's and the vendor's end) will have access to their environment | Yes | Yes |
| | | Is there logical segmentation of application users? | Specify/Establish if there is logical segmentation of users. | | Yes. Upload evidence for user segmentation. |
| Access logs | 1 (of 1) controls on | Are there logs of access attempts to production environment? | Specify if access attempts are logged. If yes, how long are the logs retained? | Yes | Yes. Retained for a year. |

Security and configuration policy information and evidence may include and/or be structured as follows:

| Control Set Name | Control Set - Sample Value | Control Name | Control Description | Manual attestation? | Control - Sample Value | Sample Manual Evidence Document |
|---|---|---|---|---|---|---|
| Policies for information security | 2 (of 2) controls on | Do you have an information security policy that is owned and maintained by a security team? | Specify/establish if you have a information security policy. If yes, could you share/upload a manual evidence? | | Yes. We build our security policy based on NIST framework. | Policy document |
| | | Are all security policies reviewed periodically? | Specify if security policies are reviewed frequently. If yes, specify the frequency of review. | | Yes. Reviewed every year. | Show the matrix used for reviews |
| Policies for security configurations | 3 (of 3) controls on | Are security configuration standards maintained and documented? | Specify if all security configuration standards are maintained and documented. If yes, could you share/upload a manual evidence? | | Yes | Upload security configuration documentation if available |
| | | Are security configurations reviewed frequently? | Specify if security configurations are reviewed frequently. If yes, specify the frequency of review. | | Yes. Reviewed every 3 months | |
| | | Are changes to | Specify if configuration | | Yes. All changes to | |

-continued

| Control Set Name | Control Set - Sample Value | Control Name | Control Description | Manual attestation? | Control - Sample Value | Sample Manual Evidence Document |
|---|---|---|---|---|---|---|
| | | configurations logged? | changes are logged. | | configurations are monitored and logged. Alerts are raised when configurations are changed. | |

Application security information and evidence may include and/or be structured as follows:

| Control Set Name | Control Set- Sample Value | Control Name | Control Description | Manual attestation? | Control- Sample Value |
|---|---|---|---|---|---|
| Secure Software Development Lifecycle | 5 (of 5) controls on | Is development, test, and staging environment separate from the production environment? | Specify if development, test, and staging environment is separate from the production environment. | | Yes |
| | | Do security engineers work with developers on security practices? | Specify if developers and security engineer work together on secure coding practices. | | Yes |
| | | Is customer data ever used in the test, development, or QA environments? | Is customer data ever used in the test, development, or QA environments? If yes, what data is used and what is it used for? | | No |
| | | Is SSL/TLS enabled for all web pages/communications that uses customer data? | Specify/Establish if a secure connection (like SSL/TLS) is used for all communications with customer data. | | Yes. Upload evidence that shows that secure connections are being used |
| | | Are application image snapshots backed up? | Specify if image snapshots are backed up. If yes, is there a process to ensure that image snapshots containing Scoped Data are authorized prior to being snapped? Is access control implemented for the image snapshots? | | Yes. Images are backed up with customer's and management's approval |
| Application Security Review | 9 (of 9) controls on | Is secure code review done prior to each release? | Specify if a security code review is done prior to each release. | | Yes |
| | | Are penetration tests performed? Can we get reports of penetration testing? | Specify if penetration tests are performed on the application. If yes, can you share the last 3 reports as manual evidence? | | Yes. Upload penetration test report |
| | | All available high-risk security patches applied and verified regularly? | Specify if high risk security patches are applied regularly. If yes, how often is it applied? | | Yes. Security patches are applied monthly. |
| | | Are vulnerability scans performed against all internet facing applications regularly and after significant changes? | Specify if vulnerability scans are performed on all internet facing applications. If yes, how often is it done? | | Yes. Vulnerability scans are done monthly. Report of the latest vulnerability scan |

| Control Set Name | Control Set-Sample Value | Control Name | Control Description | Manual attestation? | Control-Sample Value |
|---|---|---|---|---|---|
| | | | Can we get a copy of the report? | | is attached. |
| | | Are vulnerability scans performed against internal networks and systems? | Specify if vulnerability scans are performed on internal networks and systems. If yes, how often is it done? | | Yes. Vulnerability scans are done monthly. |
| | | Are third party alert services used to keep up to date with the latest vulnerabilities? | Specify if third party alert services are used to stay up to date on latest vulnerabilities. If yes, could you provide more details? | | Yes. Third party alert services provide updates on vulnerabilities every 24 hours. |
| | | Are there processes to manage threat and vulnerability assessment tools and the data they collect? | Specify if there are processes to manage threat and vulnerability assessment tools and their findings. Could you provide more details on how threats and vulnerabilities are managed? | | Yes. All threats and vulnerabilities from different sources are aggregated in one portal. They are managed by severity. |
| | | Is there a self service portal where buyers can modify their application security configurations? | Specify if there is a self service portal for buyers to modify their security configuration. Can you provide details on how this can be done? | | Yes. Provide details on the portal available for buyers to modify their security configurations. |
| | | Is anti malware scanning done against the network and systems hosting the application regularly? | Specify if anti malware scanning is done against the network and systems hosting the application. If yes, how often is it done? Can you provide the report? | | Yes. Anti malware scans are performed monthly. Upload a report of the latest scan. |
| Application Logs | 3 (of 3) controls on | Are application logs collected and reviewed? Do you have tools/alerts in place to monitor events uncover potential incidents? | Specify if application logs are collected and reviewed. If yes, do you have tools in place to monitor these logs for potential incidents? | | Yes. Provide details of the tools in place to monitor logs. |
| | | Are operating system and application logs protected against modification, deletion, and/or inappropriate access? | Establish that operating system and application logs are protected against modification, deleted and/or inappropriate access | | Yes |
| | | Do you store customer's PII data in logs? | What data will be stored in application logs? Do you store customer's PII data? | | No. Data about customer's use will be stored in logs. No PII data will be stored in the logs. |
| Change Control Policy | 5 (of 5) controls on | Is functional and resiliency testing done before implementing a change? | Specify if functional and resiliency testing is done on the application before a new release. | | Yes |
| | | Are change control procedures required for all changes to the production environment? | Specify if change control procedures are in place for all changes made in the production environment. | | Yes |
| | | Do you have a process in place to verify that human error/risks don't | Specify/Establish that there's a process to verify that human | | Yes |

-continued

| Control Set Name | Control Set-Sample Value | Control Name | Control Description | Manual attestation? | Control-Sample Value |
|---|---|---|---|---|---|
| | | get pushed into production? | error/risks don't get pushed into production. | | |
| | | Do you document & log changes that may impact their service? | Specify if changes are documented & logeed. | | Yes |
| | | Is there a formal process to ensure clients are notified prior to changes being made which may impact their service? | Specify if clients will be notified prior to making changes that may impact their service. | Yes | Yes |

Business resiliency information and evidence may include and/or be structured as follows:

| Control Set Name | Control Set-Sample Value | Control Name | Control Description | Manual attestation? | Control-Sample Value |
|---|---|---|---|---|---|
| Business Resiliency | 7 (of 7) controls on | Is there a periodic review of your Business Resiliency Program? | Specify if the business resiliency program is reviewed periodically. If yes, how often is the program reviewed? | | Yes, business resiliency program is reviewed annually. |
| | | Are site failover tests performed at least annually? | Specify if failover tests are performed annually. If no, how often are they performed? | | Yes |
| | | Has a Business Impact Analysis been conducted? | Specify if a business impact analysis was done. If yes, when was it done last? Please provide more details on the analysis conducted. | | Yes. Business Impact Analysis was done 6 months. Provide details on the results of the analysis. |
| | | Are there any dependencies on critical third party service providers? | Specify if there is any dependency on third party vendors. If yes, can you provide more details on the vendors? | | Yes. Provide more details on the third party vendors |
| | | Are all third party providers for the application involved in annual continuity and recovery tests? | Specify if continuity and recovery tests will be performed on all third party vendors that provide critical services. | | Yes |
| | | Do contracts with Critical Service Providers include a penalty or remediation clause for breach of availability and continuity SLAs? | Is penalty or remediation steps for breach of availability and continuity included in contracts with third party vendors? | | Yes |
| | | Do you have monitors/alerts to understand the health of the system? | Specify if monitors/alerts are in place to understand the health of the system. | | Yes |
| Business Continuity | 4 (of 4) controls on | Are formal business continuity procedures developed and documented? | Specify if formal business procedures are developed and maintained for business continuity. If yes, provide more details on the procedures. | | Yes |
| | | Are specific response and recovery strategies defined for the prioritized activities? | Specify if recovery and response strategies are developed for customer facing activities/services | | Yes |

-continued

| Control Set Name | Control Set-Sample Value | Control Name | Control Description | Manual attestation? | Control-Sample Value |
|---|---|---|---|---|---|
| | | Do you have a system in place to assure business continuity in case of a failure? | Specify if you have a system in place to assure business continuity in case of a failure. If yes, within how long will this system be activated? Could you provide more details? | | Yes. In case of a failure, systems for business continuity will be activated within two hours. |
| | | Do you limit a buyer's ability to impose load that may impact availability for other users of your system? | Specify if one buyer's load can impact availability for another buyer. If yes, what is the threshold until which there will be no impact? If no, can you provide more details on how you ensure services are not impacted during peak usage and above? | Yes | Yes |
| Application Availability | 4 (of 4) controls on | Have there been any issues related to reliability/availability in the last 90 days? Could you provide an availability record? | Specify if there have been any issues related to reliability/availability in the past. Could you provide an availability record? | Yes | Yes. Please provide an availability record. |
| | | Is there a scheduled maintenance window which results in client downtime? If yes, what is the downtime? | Specify if there is a scheduled maintenance window during which services might be down. If yes, how long is the downtime? | | No |
| | | Is there an online incident response status portal, which outlines planned and unplanned outages? | Specify if there is an incident status portal that outlines planned and unplanned outages. If yes, provide details on how a customer can access it? How long after the outage will the portal be updated? | Yes | Yes. Provide details of the incident status portal. |
| | | Is there a specific Recovery Time Objective (RTO)? | Is there a specific Recovery Time Objective (RTO)? If yes, can you provide the recovery time objective (RTO)? | | Yes. 2 hours |

End user device/mobile security information and evidence may include and/or be structured as follows:

| Control Set Name | Control Set-Sample Value | Control Name | Control Description | Manual attestation? | Control-Sample Value |
|---|---|---|---|---|---|
| Asset/Software Inventory | 2 (of 2) controls on | Is the asset inventory list updated periodically? | Specify if an asset inventory is maintained. If yes, how often is it updated? | | Yes. Inventory is updated weekly. |
| | | Are all installed software platforms and applications on Scoped Systems inventoried? | Specify if inventory of all installed software and applications is maintained. If yes, how often is it updated? | | Yes. Inventory is updated weekly. |
| Asset Security | 6 (of 6) controls on | All available high-risk security patches applied and verified at least monthly on all end user devices? | Specify if all high risk security patches are applied at least monthly. If no, how often is it applied? Can you provide more details on how you manage patching? | | Yes |

-continued

| Control Set Name | Control Set-Sample Value | Control Name | Control Description | Manual attestation? | Control-Sample Value |
|---|---|---|---|---|---|
| | | Do you have endpoint security? | Specify if endpoint security is installed on all devices. If yes, can you provide more details on the tool and how it is maintained? | | Yes |
| | | Is maintenance and repair of organizational assets performed and logged, with approved and controlled tools? Could the maintenance window lead to downtime? | Is maintenance and repair of all assets performed and logged with controlled tools? If yes, could you provide more details on how it is managed? Will the maintenance lead to downtime for customers? | | Yes. All maintenance of devices is logged, this maintenance does not lead to downtime. |
| | | Are End User Devices (Desktops, Laptops, Tablets, Smartphones) used for transmitting, processing or storing scoped Data? | Will end user devices be used to transmit, process or store scoped data? | Yes | No |
| | | Are employees prevented from accessing production environment via private unmanaged devices? | Specify if stringent access control is enabled for access to production environment (for ex : are employees prevented from accessing production environment via private unmanaged devices?). | | Yes. Production environment can only be accessed from the corporate environment and from the devices on this environment. |
| | | Do the devices have access control enabled? | Specify if devices have access controls (like RBAC) enabled. | | Yes. Least privilege access is implemented for all devices. |
| Device Logs | 3 (of 3) controls on | Are sufficient details logged in Operating system and device logs to support incident investigation? | Specify if sufficient details (like successful and failed login attempts and changes to sensitive configuration settings and files) are included in the logs to support incident investigation. If no, can you provide more details on how you handle incident investigation? | | Yes |
| | | Are device logs protected against modification, deletion and/or inappropriate access? | Establish that device logs are protected against modification, deleted and/or inappropriate access. If yes, can you provide more details on how you enforce it? | | Yes. Changes to logs are enforced by access control. All changes to logs lead to an alert. |
| | | Are logs retained for sufficient time to investigate an attack? | How long will the logs be retained? | | Yes. 2 years |
| Mobile Device Management | 4 (of 4) controls on | Is there a mobile device management program? | Specify if there is a mobile device management program. If yes, please specify what tool is used for mobile device management | Yes | Yes |
| | | Are staff technically prevented from accessing production environment via non-managed private mobile devices? | Specify if employees are prevented from accessing production environment via unmanaged private mobile devices. If no, how do you enforce this control? | | Yes |

| Control Set Name | Control Set-Sample Value | Control Name | Control Description | Manual attestation? | Control-Sample Value |
|---|---|---|---|---|---|
| | | Are employees allowed to use mobile devices to view or process customer data? | Specify if employees are allowed to access scoped data via their mobile phones. If yes, what is the use case for allowing access via mobile phones? how do you control/monitor access? | | No |
| | | Is there an approved process for IT to off-board mobile devices upon employee termination, or when an employee requests to on-board a new mobile device? | Is there an approved process for IT to off-board mobile devices upon termination, or when an employee requests to on-board a new mobile device? If yes, specify/establish that this process includes secure disposal of data on these devices. | | Yes |

Infrastructure security information and evidence may include and/or be structured as follows:

| Control Set Name | Control Set-Sample Value | Control Name | Control Description | Manual attestation? | Control-Sample Value |
|---|---|---|---|---|---|
| Physical Security | 3 (of 3) controls on | Are all individuals that need to access a facility, property, vehicle, or other asset in-person required to provide photo ID and credentials? | Are all individuals that need to access a facility, property, vehicle, or other asset in-person required to provide photo ID and credentials? | | Yes |
| | | Are physical security and environmental controls in place in the data center and office buildings? | Specify if physical security and environment controls are in place for all the facilities | | Yes |
| | | Are visitors permitted in the facility? Are you recording visitor access? | Specify if visitors are permitted in the facility. If yes, are logs maintained? How long will it be maintained? | | Yes. Logs will be maintained for 2 years |
| Network Security | 5 (of 5) controls on | Is the production environment/systems open to external network connections? | Specify if the production environment is open to external network connections. If yes, how do you control access? | | No |
| | | Are firewalls used to isolate critical and sensitive systems into network segments separate from network segments with less sensitive systems? | Specify if firewalls are used to isolate critical and sensitive segments from segments with less sensitive systems | | Yes |
| | | Are all firewalls rules reviewed and updated regularly? | How often are firewall rules reviewed and updated? | | Yes. Firewall rules are updated every 3 months |
| | | Are Intrusion Detection/Prevention Systems employed in all sensitive network zones and wherever firewalls are enabled? | Specify if intrusion detection/prevention systems are enabled in all sensitive network zones. | | Yes |

| Control Set Name | Control Set-Sample Value | Control Name | Control Description | Manual attestation? | Control-Sample Value |
|---|---|---|---|---|---|
| | | Do you have Security and hardening standards in place for network devices? | Specify if you have Security and hardening standards in place for network devices. If yes, can you provide more details (including details about how often these standards are implemented/updated) | | Yes. Security and Hardening Standards are implemented on network devices monthly. |
| Cloud services | 5 (of 5) controls on | Do you use platforms other than AWS to host your application? | Do you use platforms other than AWS to host your application? If yes, can you specify the platforms that you use? | Yes | No |
| | | Is there a client management portal which allows distributed business accounts to be managed under a single central corporate account? | Specify if there is a client management portal which allows distributed business accounts to be managed under a single central corporate account. If yes, can you provide details on how this portal can be accessed? | Yes | Yes |
| | | Are application self service features or an Internet accessible self-service portal available to clients? | Are application self service features or an Internet accessible self-service portal available to clients? If yes, what use cases can this portal be used for? | Yes | Yes |
| | | Can clients run their own security services within their own cloud environment? | Can clients run their own security services within their own cloud environment? If yes, are there any exceptions to the kind of services they can run? | Yes | Yes |
| | | Are there controls in place to prevent clients from accessing the data of others in a multi-tenant environment? | Specify if there are controls in place to prevent one client from accessing the data of another client in a multi-tenant environment. If yes, can you provide more details about these controls? | Yes | Yes |

Human resources information and evidence may include and/or be structured as follows:

| Control Set Name | Control Name | Control Description | Control-Sample Value |
|---|---|---|---|
| Human Resources Policy | Is background screening done before employment? | Specify if background screening is done for all employees before employment. | Yes |
| | Is an employment agreement signed before employment? | Specify if an employment agreement is signed before employment. | Yes |
| | Do all employees undergo | Specify if employees undergo security | Yes. They undergo |
| | Security awareness training regularly? | training regularly. If yes, how often do they undergo security training? | security training annually. |
| | Is there a disciplinary process for non compliance of human resource policies? | Specify if there is a disciplinary process for non compliance of human resource policies. | Yes |
| | Are background checks performed for Service Provider | Specify if background checks are done for third party vendors and | Yes. Background check is |

-continued

| Control Set Name | Control Name | Control Description | Control-Sample Value |
|---|---|---|---|
| | Contractors and Subcontractors? | contractors/subcontractors. If yes, is the background check done regularly? | done annually |
| | Do information security personnel have professional security certifications? | Specify if all critical security personnel have security certifications. | Yes |
| | Is there a process to verify return of constituent assets upon termination? | Specify if there is a process to verify return of constituent assets upon employee termination. | Yes |

It should be appreciated that the various categories of data, controls, and corresponding and evidence described above are given by way of examples. Various other controls, and various combinations or sub-combinations of the above-described controls can be used to evaluate an application and generate a risk assessment thereof.

Figure 5:
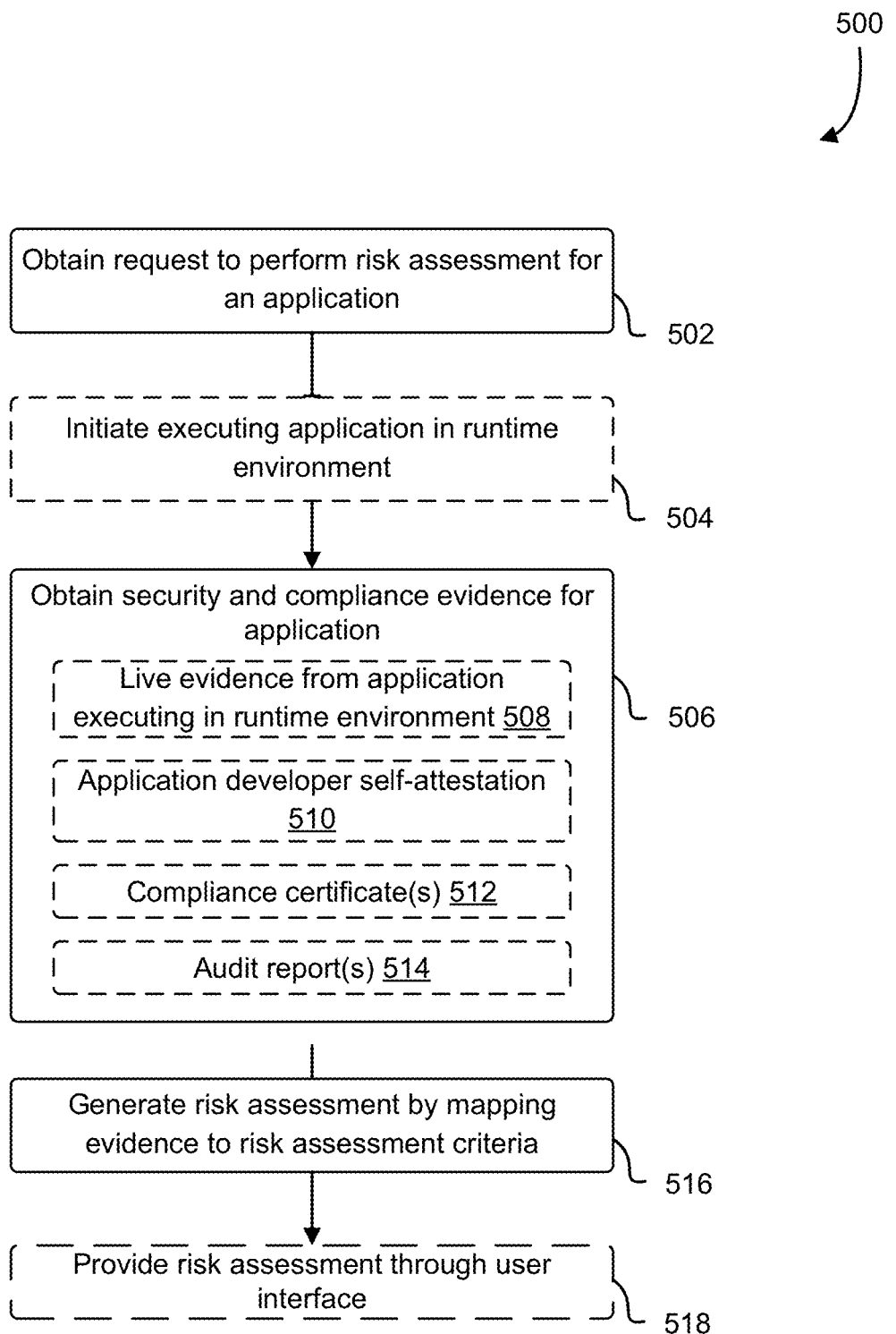
FIG. 5 illustrates an example process for performing a risk assessment on an application, according to at least one embodiment.

FIG. 5 illustrates an example process 500 for performing a risk assessment on an application. In some aspects, process 500 may be performed by one or more of a risk assessment service 112, 204, 300, an audit management system 110, and/or may utilize one or more data structures, such as data structure 400 described above in reference to FIGS. 1-4. As used herein, dashed lines within process diagrams may indicate that a given operation is optional, such that the described process may be performed with or without the identified operation.

Process 500 may begin at operation 502, in which a request to perform a risk assessment for an application may be received, for example, by a risk assessment service. The request may identify an application that already has a profile within the risk assessment service, such as may be managed by a product or application profile service 318 and/or an application catalogue 310. In some cases, the application may have already been provided by a developer of the application, through a vendor interface 304. In some aspects, process 500 may proceed to optional operation 504, in which execution of the application in a runtime or production environment may be initiated. The runtime environment may be provided by a computing resource service provider that also provides the risk assessment service. In other examples, process 500 may be performed without a discreet request to generate a risk assessment, such as from a user. In these cases, such as upon uploading an application for assessment by a vendor, some or all of operations of process 500 may be performed. In some cases, upon uploading or otherwise submitting the application for assessment, the system may generate an assessment of the application, and add the assessment of a catalogue of available applications, such as catalogue 310.

Next, at operation 506, security and compliance evidence for the application may be obtained. Operation 506 may include obtaining evidence and operational data from any of a number of different sources, such as live evidence from the application executing in the runtime environment 508, an application developer self-attestation and/or other information provided by the developer, such as responses to questions concerning the application, compliance certificates 512, and/or audit reports 514. In some cases, all available evidence may be obtained. In yet other cases, evidence from only a subset of the evidence sources 508-514 may be obtained. In yet some cases live evidence 508 may be obtained, such as when operation 504 is performed, and at least one evidence 510, 512, and 514 may be used to supplement that data.

Process 500 may proceed to operation 516, in which a risk assessment may be generated by comparing or mapping the obtained evidence to a risk assessment criteria. Operation 516 may include comparing and/or mapping the various evidence data to one or more different categories, control sets, controls/variables, and/or evidence source indications as described in greater detail above in reference to FIG. 4. As used herein, the risk assessment criteria may include some or all of the various categories, control sets, controls/variables, and/or evidence source indications described in reference to FIG. 4. Process 500 may optionally proceed to operation 518, in which the risk assessment may be represented and provided through a user interface, accessible by the submitter of the request in operation 502. In some cases, prior to making the risk assessment available for viewing by a user, portions, such as containing sensitive information, may be redacted from the risk assessment to protect confidential data. In yet some cases, the viewer of the risk assessment may be prompted to agree to an NDA prior to accessing the risk assessment.

In some instances, the user interface provided in operation 518 may include a comparison function, whereby risk assessments of multiple applications may be presented side by side, to enable a user to compare different applications across a number of security controls or variables. In some cases, different attributes or variables of the applications selected for comparison may be customized/configured, so that a user may quickly and efficiently be able to compare a large amount of data across a number of different applications. In this example, operations 502-516 may be performed for each application, whereby the user interface can then collect the different risk assessments and generate a visualization of the different assessments, across a number of default or configured variables or controls. In some cases, this comparison function may provide the different attributes or criterion of different applications all at one time, such as to make the information more readily comprehendible.

In some cases, the user interface provided in operation 518 may be either an overview of the risk assessment, such as that may not contain any sensitive or confidential information (e.g., excluding some evidence sources, values of the evidence, and/or some variables or controls) or, a full risk assessment, which may include sensitive or confidential information (e.g., including all available evidence sources and variables). In the case that the full risk assessment is provided, agreement to non-disclosure terms, such as described above, may be required. In the example of an overview of a risk assessment, this version of the risk assessment may be generated, such as by a risk assessment service, so as not to include sensitive or confidential information. In some cases, the overview risk assessment may, however, contain import features pertaining to the application or assessment thereof, such as to enable robust search functionality by potential users of the application. For example, an overview risk assessment may include what compliance certificates the application has or is associated with, one or more subsets of various security features that the application conforms to or has enabled (e.g., is data encrypted at certain stages in the application processing), audit report or other report scores or ratings (e.g., a Score-Card or other external or independent rating organization), and other features or attributes that users of the application may find useful to know in selecting that application. In some cases, the overview risk assessment may be catalogued for ease of searching, such as in catalogue 310 described above in reference to FIG. 3. In some aspects, the comparison function, described above, may be particularly useful when comparing different overviews of risk assessments.

Figure 6:
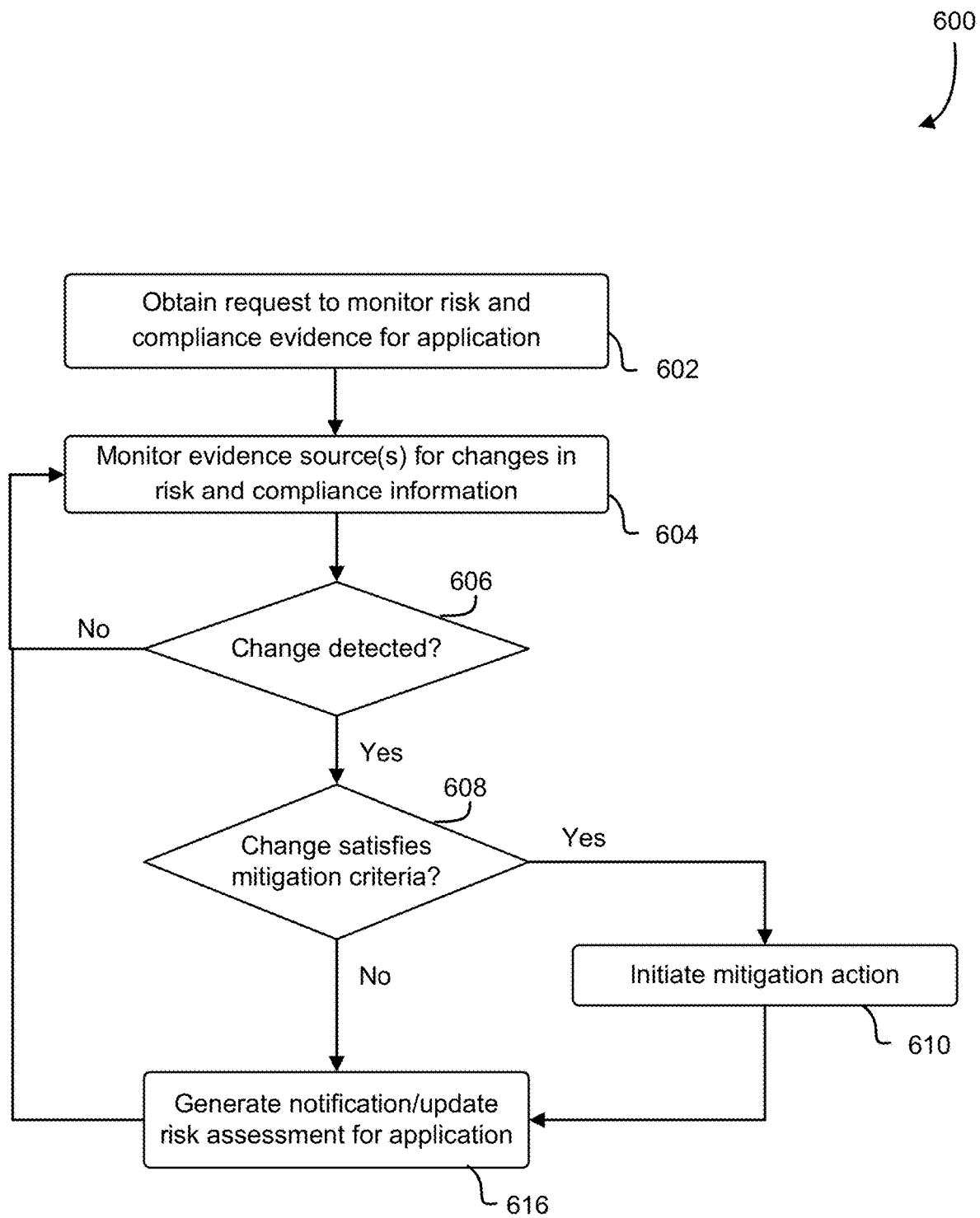
FIG. 6 illustrates an example process for monitoring an application to update a risk assessment for that application, according to at least one embodiment.

FIG. 6 illustrates an example process 600 for monitoring an application to update a risk assessment for that application. In some aspects, process 600 may be performed by one or more of a risk assessment service 112, 204, 300, an audit management system 110, and/or may utilize one or more data structures, such as data structure 400 described above in reference to FIGS. 1-4. In some aspects, process 600 may be performed after an application is selected by a user for operation (e.g., after performance of process 500 described above), and may be used to provide security and risk assessment updates for the application executing in a runtime environment.

Process 600 may begin at operation 602, in which a request to monitor risk and compliance evidence for an application may be received. In some cases, the request may be received through a user interface 304 of a risk assessment service. In other cases, instead of operation 602, process 600 may be automatically triggered upon a user selecting an application for use through the risk assessment service. In either case, responsive to the request, one or more evidence sources may be monitored for changes in the risk and compliance information relating to the application, at operation 604. Operation 604 may include monitoring the application in a runtime environment, such as to obtain live evidence of the application. In yet some cases, operation 604 may additionally or alternatively include monitoring other evidence sources, such as application developer attestations, or other related evidence provided by the developer, compliance reports, and/or audit reports.

In some aspects, the risk assessment service may provide for a message board, messaging application, or other similar interface to enable others to access information and responses from the developer to questions submitted by users relating to the risk and compliance information of an application. In some cases, various techniques, such as natural language processing, may be used to identify key words and phrases to provide answers to user questions from similar questions already asked by other users relating to the same application. In one specific example, a user may ask the application developer or vendor about a particular security risk. A second user, also seeking to evaluate the application for use, may ask a similar question about a related security risk. The prior answer may be supplied to the second user's question based on the fact that both questions relate to a similar or related security issue. In this way, more data may be made available in a more efficient way for a user to evaluate an application for use.

Retuning to process 600, in some cases operation 604 may be performed continuously, periodically, or aperiodically, or based son a triggering event, such as an updated compliance or audit report. In some cases, the frequency of the monitoring individual evidence sources may be determined by user selection or configurator, or based on the type of evidence source. For example, live evidence may be monitored whenever it is made accessible to the risk assessment service. Compliance and audit report information may be monitored at given intervals, or when a new report or certification is published. Similarly, additional information provided by the application vendor may be monitored and detected when it is made available, or at regular intervals, as a few examples.

Process 600 may proceed to operation 608, in which it may be determined if a change is detected in one or more evidence sources. If no change is detected, process 600 may loop back through operations 604 and 606, until a change is detected. When a change is detected, at operation 608, it may then be determined if the change satisfies a mitigation criteria, which may dictate when actions should be taken immediately or in a short time from detection, to mitigate security risks, breaches of data, etc. If the change does satisfy a mitigation criteria, then a mitigation action may be initiated, at operation 610. In some cases, operation 610 may include triggering an action to be taken by a security service, such as may be provided by a computing resource service provider 102.

Process 600 may then proceed to operation 616, in which a notification of the change may be generated and/or made available to the user, and/or the risk assessment for the application updated. If the change that is detected does not satisfy a mitigation criteria, at operation 608, process 600 may proceed directly to operation 616. Upon completion of operation 616, process 600 may loop back to operation 604 and continue to monitor the application. In some cases, operation 616 may include updating the risk assessment and/or sending a notification to a user upon detection of the change, periodically, or at various other times.

Figure 7:
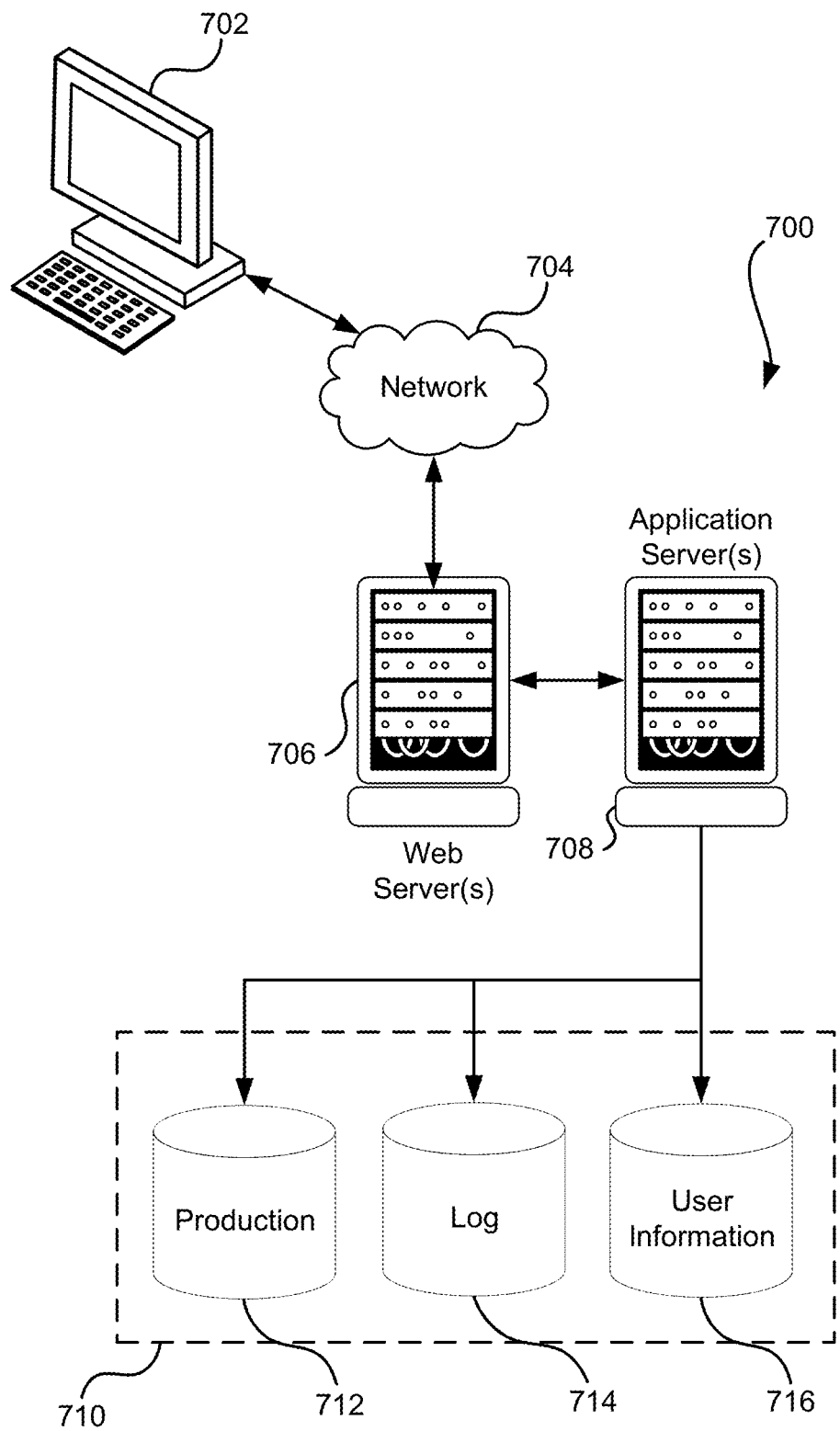
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer implemented method comprising:
obtaining, from a plurality of evidence sources, security and compliance evidence for an application offered through an interface providing a plurality of different applications for use provided by a computing resource service provider, the plurality of evidence sources comprising:
  operational data from the application executing within a runtime environment provided by the computing resource service provider; and at least one of:
  a compliance certificate obtained from an independent certification organization; or
  a self-attestation generated by a producer of the application;
mapping the obtained security and compliance evidence to risk assessment criteria to generate a risk assessment of the application, the risk assessment criteria comprising a plurality of control sets including indications of potential security and risk vulnerabilities of the application;
generating a representation of the risk assessment across at least a subset of the plurality of controls based on the risk assessment;
actively monitoring at least one of the plurality of evidence sources for a change in the security and compliance evidence for the application; and
updating the risk assessment representation based on the at least one change detected in the security and compliance evidence for the application.

2. The computer-implemented method of claim 1, wherein the plurality of evidence sources further comprises producer responses or other responses to inquiries about the application, wherein the method further comprises:
generating the second representation of the risk assessment based at least in part on the obtained security and compliance evidence for the application.

3. The computer-implemented method of claim 1, further comprising:
obtaining, from a client device that is different from the producer, a request to view the risk assessment representation; and
responsive to obtaining the request, redacting at least a part of the risk assessment representation and providing the redacted risk assessment representation to the client device.

4. The computer-implemented method of claim 1, further comprising:
responsive to detecting the at least one change in the security and compliance evidence for the application, determining that the at least one change warrants a mitigation action; and
automatically triggering a security response to initiate performance of the mitigation action.

5. A system, comprising:
one or more processors; and
memory that stores computer-executable instructions that, if executed, cause the one or more processors to:
  obtain, from an evidence source, security and compliance evidence for an application offered through a computing resource service provider, the evidence source comprising operational data from the application executing within a runtime environment provided by the computing resource service provider;
  map the obtained security and compliance evidence to risk assessment criteria to generate a risk assessment, the risk assessment criteria comprising a plurality of attributes of the application, the plurality of attributes including indications of potential vulnerabilities of the application;
  generate a representation of the risk assessment across at least a subset of the plurality of attributes based on the risk assessment; and
  update the risk assessment representation based on monitoring of the security and compliance evidence for the application.

6. The system of claim 5, wherein the evidence source further comprises:
an audit report obtained from an independent certification organization, or
a self-attestation generated by a producer of the application.

7. The system of claim 5, wherein the memory stores additional computer-executable instructions that, if executed, further cause the one or more processors to:
continuingly monitoring the evidence source to detect changes in the security and compliance evidence for the application; and
updating the risk assessment representation based on a detected change in the security and compliance evidence.

8. The system of claim 5, wherein the memory stores additional computer-executable instructions that, if executed, further cause the one or more processors to:
obtain, from a client device that is different from the producer, a request to view the risk assessment representation; and
responsive to obtaining the request, providing an overview of the risk assessment to the client device, wherein the overview of the risk assessment:
omits at least some sensitive or confidential data contained in the risk assessment, and
indicates at least one compliance standard that the application satisfies.

9. The system of claim 5, wherein the memory stores additional computer-executable instructions that, if executed, further cause the one or more processors to:
obtain, from a client device that is not associated with the producer, a request to view the risk assessment representation;
responsive to obtaining the request, present a nondisclosure agreement to the client device; and
responsive to receiving an indication of agreement to the non-disclosure agreement, provide the risk assessment representation to the client device.

10. The system of claim 5, wherein the memory stores additional computer-executable instructions that, if executed, further cause the one or more processors to:
obtain a request to view a second risk assessment representation of a second instance of the application; and
generate the second representation of the risk assessment based at least in part on the obtained security and compliance evidence for the application.

11. The system of claim 10, wherein the memory stores additional computer-executable instructions that, if executed, further cause the one or more processors to:
obtain an inquiry concerning the second instance of the application; and
responsive to the query, obtain a response relating to the inquiry from security and compliance evidence for the application.

12. The system of claim 5, wherein the memory stores additional computer-executable instructions that, if executed, further cause the one or more processors to:

map the obtained security and compliance evidence to the risk assessment criteria to generate the risk assessment using at least one trained model, wherein the at least one trained model comprises indicators of the obtained security and compliance evidence that correspond to individual attributes of the plurality of attributes of the application.

13. The system of claim 5, wherein the memory stores additional computer-executable instructions that, if executed, further cause the one or more processors to:
   execute, by an audit management system, the application within the runtime environment provided by the computing resource service provider; and
   generate the evidence based on collected data from the application executing within the runtime environment provided by the computing resource service provider.

14. A non-transitory computer-readable storage medium storing thereon executable instructions that, as a result of being executed by one or more processors of a computer system, cause the computer system to at least:
   obtain, from a plurality of data sources, security and compliance data for an application offered through a computing resource service provider, the plurality of data sources comprising at least one of:
      data from the application executing within a runtime environment of the computing resource service provider,
      at least one compliance certificate of the application, or
      a self-attestation generated by a producer of the application;
   generate a risk assessment of the application based on the obtained security and compliance data, the risk assessment comprising a plurality of indicators of the security and vulnerability of the application across a plurality of variables; and
   update the risk assessment based on monitoring of changes in the security and compliance data for the application.

15. The non-transitory computer-readable storage medium of claim 14, wherein the instructions further comprise instructions that, as a result of being executed by the one or more processors, cause the computer system to:
   continuously monitor the plurality of data sources to detect changes in the security and compliance data for the application.

16. The non-transitory computer-readable storage medium of claim 15, wherein the instructions further comprise instructions that, as a result of being executed by the one or more processors, cause the computer system to:
   periodically update the risk assessment based on the detected changes in the security and compliance data for the application.

17. The non-transitory computer-readable storage medium of claim 14, wherein individual variables of the plurality of variables comprise a first indicator that is based on a first data source of the plurality of data sources and a second indicator that is based on a second data source of the plurality of data sources.

18. The non-transitory computer-readable storage medium of claim 14, wherein the plurality of data sources comprise the at least one compliance certificate of the application, and wherein the instructions further comprise instructions that, as a result of being executed by the one or more processors, cause the computer system to:
   generate a notification when the at least one compliance certificate expires.

19. The non-transitory computer-readable storage medium of claim 14, wherein the plurality of variables comprise a plurality of controls relating to access, storage, or transfer of data used by the application, and wherein individual indicators of the plurality of indicators indicate whether individual controls are active.

20. The non-transitory computer-readable storage medium of claim 14, wherein the instructions further comprise instructions that, as a result of being executed by the one or more processors, cause the computer system to:
   obtain a request to view a second risk assessment of a second instance of the application; and
   generate the second risk assessment based at least in part on the risk assessment.

* * * * *